US009626714B2

(12) United States Patent
Boer et al.

(10) Patent No.: US 9,626,714 B2
(45) Date of Patent: Apr. 18, 2017

(54) LASER MOBILE PUT WALL

(71) Applicant: Dematic Corp., Grand Rapids, MI (US)

(72) Inventors: William R. Boer, Grand Rapids, MI (US); William R. Yates, Caledonia, MI (US)

(73) Assignee: Dematic Corp., Grand Rapids, MI (US)

( * ) Notice: Subject to any disclaimer, the term of this patent is extended or adjusted under 35 U.S.C. 154(b) by 19 days.

(21) Appl. No.: 14/801,911

(22) Filed: Jul. 17, 2015

(65) Prior Publication Data

US 2016/0027095 A1 Jan. 28, 2016

Related U.S. Application Data

(60) Provisional application No. 62/028,041, filed on Jul. 23, 2014.

(51) Int. Cl.
| G06F 7/00 | (2006.01) |
| G06Q 30/06 | (2012.01) |
| B65G 65/00 | (2006.01) |
| G02B 27/20 | (2006.01) |
| B65G 1/137 | (2006.01) |

(52) U.S. Cl.
CPC ....... G06Q 30/0635 (2013.01); B65G 1/1375 (2013.01); B65G 65/005 (2013.01); G02B 27/20 (2013.01); B65G 2209/04 (2013.01); B65G 2209/06 (2013.01)

(58) Field of Classification Search
None
See application file for complete search history.

(56) References Cited

U.S. PATENT DOCUMENTS

| 4,336,589 A | 6/1982 | Smith et al. |
| 4,491,982 A | 1/1985 | Candy et al. |
| 4,796,209 A | 1/1989 | Burk |
| 5,812,986 A | 9/1998 | Danelski |
| 6,011,998 A | 1/2000 | Lichti et al. |
| 6,650,225 B2 | 11/2003 | Bastian, II et al. |
| 6,775,588 B1 | 8/2004 | Peck |

(Continued)

FOREIGN PATENT DOCUMENTS

| EP | 2170742 B1 | 10/2012 |
| EP | 2421774 B1 | 12/2013 |
| WO | 2013116620 A1 | 8/2013 |

OTHER PUBLICATIONS

International Search Report (Form PCT/ISA/210) and Written Opinion of the International Searching Authority (Form PCT/ISA/237) from corresponding Patent Cooperation Treaty Application No. PCT/US2015/040840, mailed Oct. 13, 2015.

Primary Examiner — Yolanda Cumbess
(74) Attorney, Agent, or Firm — Gardner, Linn, Burkhart & Flory, LLP

(57) ABSTRACT

A method of fulfilling orders and order fulfillment system includes a mobile assembly cart having a plurality of order assembly positions and a pointer assembly. The pointer assembly generates a beam and directs the beam to at least one of said assembly positions for selectively identifying at least one of the assembly positions for putting an item to or retrieving an order from each identified position. The assembly cart can be positioned with respect to the pointer assembly for the picking or putting and moved away from the pointer assembly after the picking or putting.

24 Claims, 2 Drawing Sheets

(56) References Cited

U.S. PATENT DOCUMENTS

| | | |
|---|---|---|
| 7,155,166 B2 | 12/2006 | Swan |
| 7,984,809 B1 | 7/2011 | Ramey et al. |
| 8,015,079 B2 | 9/2011 | Ramamoorthy et al. |
| 8,170,712 B2 | 5/2012 | Battles et al. |
| 8,234,006 B1 | 7/2012 | Sachar et al. |
| 8,244,603 B1 | 8/2012 | Tang et al. |
| 8,374,926 B2 | 2/2013 | Solomon |
| 8,489,228 B2 | 7/2013 | Christ et al. |
| 8,552,834 B2 | 10/2013 | Barkan |
| 8,560,114 B2 | 10/2013 | Suess et al. |
| 8,694,154 B2 | 4/2014 | Winkler |
| 8,731,708 B2 | 5/2014 | Shakes et al. |
| 8,805,573 B2 | 8/2014 | Brunner et al. |
| 2004/0088229 A1 | 5/2004 | Xu |
| 2007/0142961 A1 | 6/2007 | Bhasin et al. |
| 2008/0048979 A1 | 2/2008 | Ruttenberg |
| 2008/0091574 A1 | 4/2008 | Hamaji et al. |
| 2008/0183328 A1* | 7/2008 | Danelski ............... G06Q 10/08 700/216 |
| 2010/0135522 A1 | 6/2010 | Batt |
| 2011/0097187 A1 | 4/2011 | Kelley et al. |
| 2011/0166694 A1 | 7/2011 | Griffits et al. |
| 2013/0200916 A1* | 8/2013 | Panagas ............... G01R 1/0441 324/757.01 |
| 2013/0211977 A1 | 8/2013 | Lyon et al. |
| 2014/0058556 A1 | 2/2014 | Kawano |
| 2014/0156553 A1 | 6/2014 | Leach et al. |

\* cited by examiner

LASER MOBILE PUT WALL

CROSS REFERENCE TO RELATED APPLICATION

This application claims priority from U.S. patent application Ser. No. 62/028,041, filed on Jul. 23, 2014, the disclosure of which is hereby incorporated herein by reference.

BACKGROUND OF THE INVENTION

The present invention is directed to a method and apparatus for fulfilling orders and, in particular, to a method and apparatus for sorting items into individual orders for packing and shipping or for picking orders. While the invention is illustrated for use with processing orders in batches, it may be used with waveless picking.

Order fulfillment of orders placed over the Internet must take place within a relatively short period of time in order to be commercially competitive. The same could be said for orders received by phone, facsimile, or by the mail based on catalog or television-based merchandizing. Such order fulfillment is known as E-commerce and places demands on an order fulfillment system to meet such obligations. This is compounded by the fact that E-commerce usually involves a large number of small orders (each containing as few as one item in the order) that are selected from a large number of potential items. Each unique item has a specific inventory identification, known in the industry as a stock-keeping unit (SKU). Each item usually bears an optical code, such as a bar code or radio frequency identification (RFID) tag that identifies the SKU of the item.

Because of the large number of SKUs from which an order may be selected, the inventory warehouse may be very large in footprint. As such, it is common to designate geographic portions of the inventory warehouse to each be picked by an individual picker such that each picker picks only a portion of each order, since each order may be spread out over the entire general footprint of the inventory warehouse. Each picker is directed by a warehouse management system to pick portions of a number of orders using a various picking technology known in the art. It is efficient to have the picker mix several orders in one picking or picked receptacle rather than having multiple receptacles, each bearing one order portion. Also, each order may be contained in a number of picked receptacles if the order contains more than an individual item. However, it is then necessary to subsequently sort the contents of the picked receptacle(s) to the order and to process the items so that they can be packed-out for shipment via courier.

SUMMARY OF THE INVENTION

The present invention allows multiple customer orders to be aggregated together and picked into mixed receptacles and sorted into individual orders. Mixed receptacles are those containing multiple different types of items for at least a portion of multiple customer orders. Other solutions not encompassed by the present invention include placing indicators on a put wall of multiple compartments for assembling the individual orders so that an operator is directed to put each item in the appropriate compartment by illuminating the indicator for that compartment. A separate operator on the opposite side of the put wall packs orders as they become complete. It is not practical for the sort operator and the pack operator to both work at the same rate so one of them has idle time. While the use of indicators is feasible for stationary put walls, it becomes clumsy for mobile put walls which allow the put wall to be wheeled away when full to a separate pack and ship station, thereby allowing both the sort operators and the pack operators to be more productive. Such mobile put walls require a separate power source and communication interface between the put wall and the computer system to allow the computer system to operate the lights as the sort operator scans an item.

Alternatively, the lights, power source and communication interface may be left off the mobile put wall with the computer system displaying to an operator which compartment to put an item in. Such mobile put wall has low operator productivity because the operator has to constantly change direction of view between the stationary display and the put wall which requires extra steps. Also, the error rate is relatively high because the operator has to correlate the screen image of the put wall and the physical put wall in order to accurately put the item.

A method of fulfilling orders and order fulfillment system, according to an aspect of the invention, includes a mobile assembly cart having a plurality of order assembly positions and a pointer assembly. The pointer assembly generates a beam and directs the beam to at least one of said assembly positions for selectively identifying at least one of the assembly positions for putting an item to or retrieving an order from each identified position. The assembly cart can be positioned with respect to the pointer assembly for the picking or putting and moved away from the pointer assembly after the picking or putting.

A computer system may be provided to identify an item and instruct the pointer assembly to direct the beam to the particular assembly position(s) as a function of the identity of that item. An item scanner may be provided for identifying each item. The pointer assembly may be capable of displaying alpha-numeric text and/or symbols at the assembly positions. The pointer assembly may be capable of self-aligning with the cart.

A plurality of carts may be provided, each having a unique identifier. The item scanner may be capable of reading the unique cart identifier. The pointer assembly may include a steerable laser assembly and direct a beam with light having a green or red spectral component. The order assembly positions may be vertically arranged and the pointer positioned above an operator's height so that the operator does not block the pointer beam. The pointer assembly may be generally stationary. The mobile assembly carts may be generally devoid of electronic components.

Items may be picked to receptacles from an inventory warehouse with multiple different items for multiple orders in each of said receptacles with each of the receptacles supplied to the mobile assembly cart for assembling of orders.

These and other objects, advantages and features of this invention will become apparent upon review of the following specification in conjunction with the drawings.

DESCRIPTION OF THE PREFERRED EMBODIMENT

Figure 1:
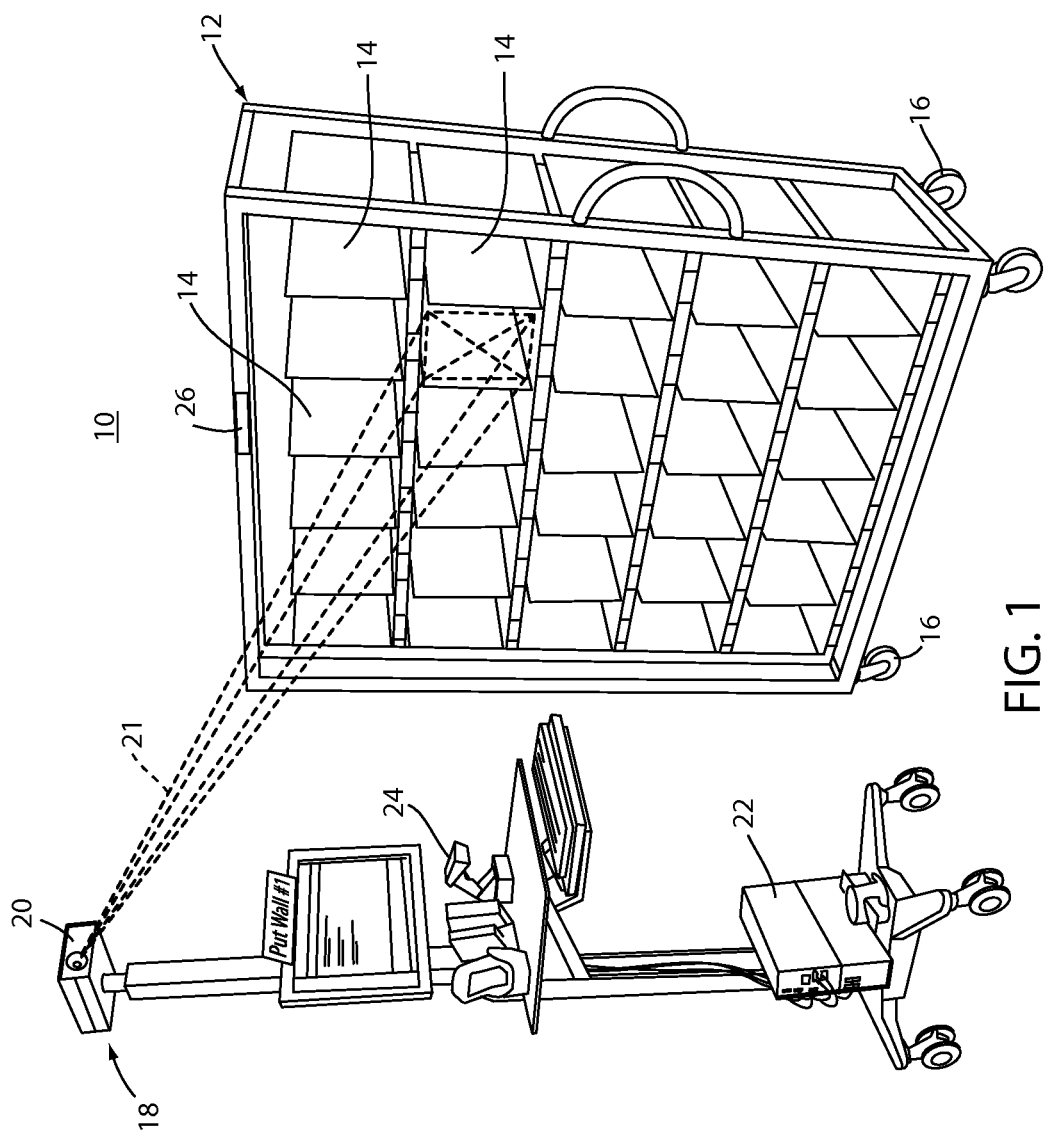
FIG. 1 is a perspective view of an order fulfillment system and method according to an embodiment of the invention.

Referring now to the drawings and the illustrative embodiments depicted therein, an order fulfillment system 10 includes a mobile assembly cart 12 made up of a plurality of order assembly positions 14 and a mobility mechanism, such as a set of wheels, such as casters 16, to provide mobility to the cart (FIG. 1). Other mobility mechanisms, such as pallet mounting, forklift openings, or the like, may alternatively be provided. Alternatively, the mobility mechanism may be an automated guided vehicle (AGV) to move the mobile assembly cart. System 10 further includes a pointer assembly 18 that includes a laser assembly 20 that generates a beam 21 of visible light and directs beam 21 to at least one of the assembly positions 14 for selectively identifying at least one of the assembly positions for putting an item to assemble a customer's order. Because assembly cart 12 is mobile, the assembly cart can be positioned with respect to pointer assembly 18 for assembling orders and moved away from the pointer assembly after orders are assembled.

A computer system 22 identifies an item, such as using a scanner 24, and instructs pointer assembly 18 to direct beam 21 to the particular one of assembly positions 14 as a function of the identity of that item. The operator then puts the identified item into the assembly position 14. Item scanner 24 may be a bar code reader, a QR code reader, an RFID reader, or the like. Pointer assembly 18 may be capable of outlining the entire perimeter of the face of the selected assembly position 14. Alternatively, or additionally, pointer assembly 18 may be capable of displaying alphanumeric text and/or symbols to the face of the selected assembly position. This allows order fulfillment system 10 to display messages on the front face of the assembly position to provide instructions to the operator. Laser 20 is a steerable laser assembly that is capable of self-aligning with mobile assembly cart 12 in order to avoid the need for accurate positioning of the mobile cart with respect to pointer assembly 18. This may be accomplished using indicia, such as reflective tape, or the like, on the four corners of the front face of the cart. In the illustrated embodiment, laser 20 is a model LP-HFD marketed by Carter Products, Inc. of Grand Rapids, Mich. Such laser generates a beam having a green or red spectral light and is capable of self-aligning and generating symbols and characters, as well as flashing.

Order fulfillment system 10 includes a plurality of mobile assembly carts 12 although only one is shown in FIG. 1. Each cart has a unique identifier, such as a bar code, RFID tag, or the like. Item scanner 24 is capable of reading the unique identifier of the cart that is positioned adjacent pointer assembly 18. In this manner, the content of each cart 12 can be tracked with the cart and one cart can be receiving items for assembling orders while other carts are wheeled to a pack-out area for packing and shipping to maximize production of both the sorting operator and the packing operator. Order assembly positions 14 are vertically arranged for easy access by the operator. Pointer assembly 18 is positioned above an operator's height so that the operator does not block pointer beam 21. Pointer assembly 18 and computer system 22 are shown as caster-mounted to provide mobility for seasonal flexibility, or the like, or may be stationary so that all of the electrical components can be hard-wired. Either way, mobile assembly carts 12 can be simple structures without any electrical components thereon.

Figure 2:
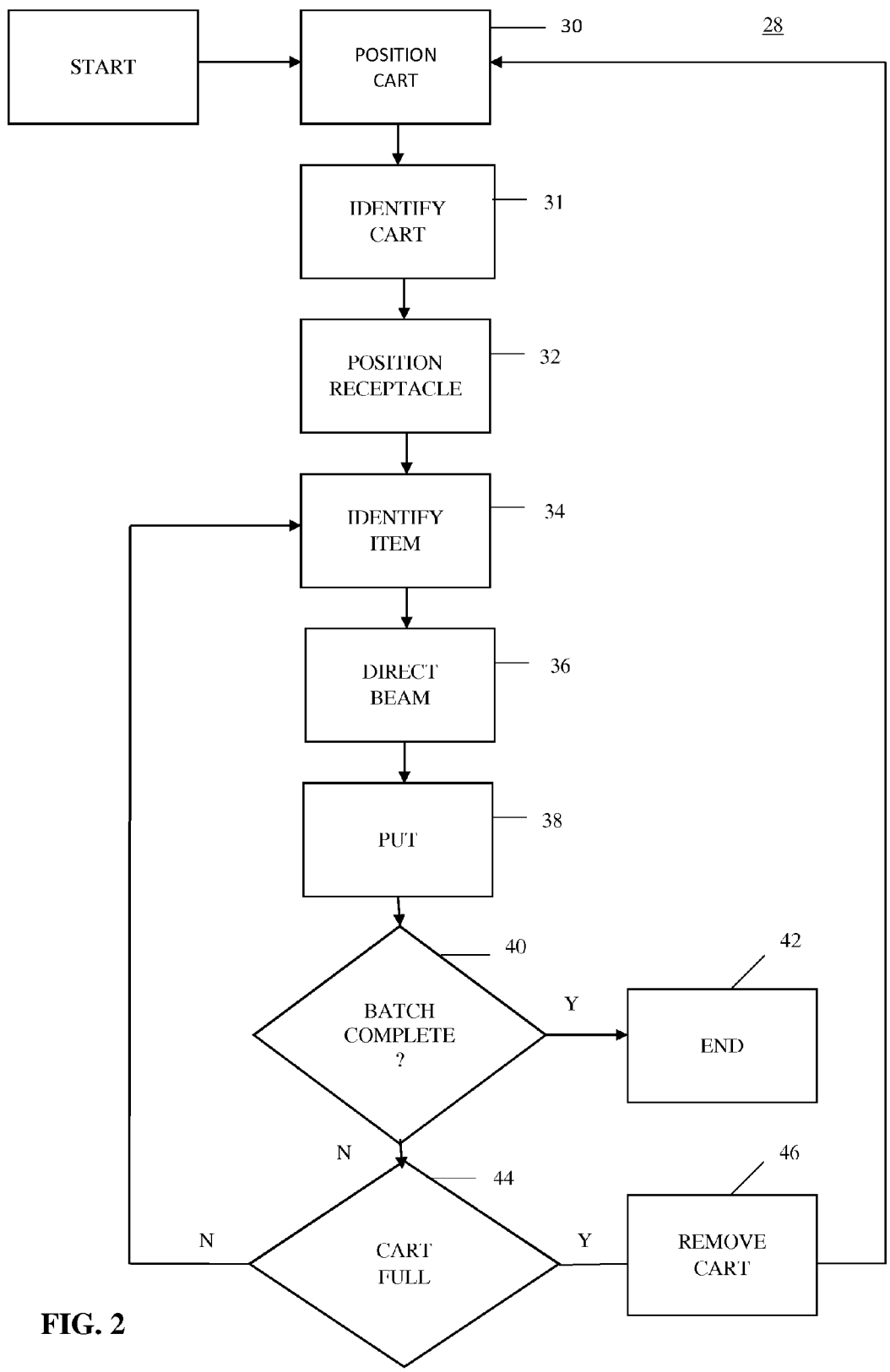
FIG. 2 is a process flow diagram of a method of fulfilling orders.

A method 28 of fulfilling orders begins by positioning at 30 a mobile assembly cart 12 adjacent to pointer assembly 18 (FIG. 2). The pointer assembly will self-align with the cart. The cart is identified at 31 using scanner 24. A receptacle (not shown) is positioned at 32 adjacent cart 12, such as with a conveyor, or the like. Items in the receptacles are picked from an inventory warehouse with multiple different items for multiple orders in each of said receptacles. The operator identifies an item at 34 using item scanner 24. Pointer assembly 18 directs beam 21 with one of the assembly positions 14 at 36 and the operator puts the scanned item in the assembly position identified with beam 21 to assemble an order at 38. Computer system 22 then determines at 40 if the batch of orders is complete and, if so, the method is complete at 42. If not, then the computer system determines at 44 whether the putting of the most recent item fills cart 12. If not, then the program returns to 32 and further items are sorted. If the cart is full, the cart is removed at 46 and the program returns to 34 and an empty or partially filled cart is positioned adjacent pointer assembly 18. The method continues until the batch is complete at 42.

While the invention is illustrated for use as a put-wall to sort items into separate customer orders, it should be understood that the principles disclosed herein can equally be applied to a pick-wall in which items are retrieved from each of the positions identified with the beam. Also, it should be understood that order fulfillment system 10 would be used with various sources of product to be scanned and placed on the put wall. For example, the product may be supplied in mixed SKU (Stock Keeping Unit) receptacles from a picking operation or in homogeneous SKU receptacles from an automated warehouse. The source receptacles can be supplied to system 10 using a conveyor system with a buffer to retain the receptacle. Alternatively, the receptacles can be supplied to system 10 using carts that accumulate batch receptacles which are then brought to system 10. Other arrangements will be apparent to the skilled artisan.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An order fulfillment system, comprising:
   a plurality of mobile assembly carts, each comprising a plurality of order assembly positions and having a unique identifier;
   a pointer assembly that is adapted to generate a beam and to direct the beam to at least one of said assembly positions for selectively identifying at least one of said assembly positions for putting an item to or picking an item from each identified position;
   a computer system adapted to identify an item and instructing said pointer assembly to direct said beam to at least a particular one of said assembly positions;
   wherein said computer system adapted to identify the identifier of the assembly cart wherein the assembly cart can be positioned with respect to the pointer assembly for picking or putting items and moved away from the pointer assembly after the picking or putting is complete.

2. The order fulfillment system as claimed in claim 1, said computer system adapted to instruct said pointer assembly to direct said beam to at least a particular one of said assembly positions as a function of the identity of that item.

3. The order fulfillment system as claimed in claim 1 including an item scanner for identifying each item.

4. The order fulfillment system as claimed in claim 3 wherein said item scanner is capable of reading said unique identifier.

5. The order fulfillment system as claimed in claim 1 wherein said pointer assembly is capable of displaying at least one chosen from alpha-numeric text and symbols at the at least one of said assembly positions.

6. The order fulfillment system as claimed in claim 1 wherein said pointer assembly comprises a steerable laser assembly.

7. The order fulfillment system as claimed in claim 1 wherein said pointer assembly is adapted to point with light having a green or red spectral component.

8. An order fulfillment system, comprising:
a plurality of mobile assembly carts, each comprising a plurality of order assembly portions; and
a pointer assembly that is adapted to generate a beam and to direct the beam to at least one of said assembly positions for selectively identifying at least one of said assembly positions for putting an item to or picking an item from each identified position, wherein the assembly cart can be positioned with respect to the pointer assembly for picking or putting items and moved away from the pointer assembly after the picking or putting is complete, wherein said pointer assembly is capable of self-aligning with one said cart.

9. An order fulfillment system, comprising:
a mobile assembly cart comprising a plurality of order assembly positions; and
a pointer assembly that is adapted to generate a beam and to direct the beam to at least one of said assembly positions for selectively identifying at least one of said assembly positions for putting an item to or picking an item from each identified position, wherein the assembly cart can be positioned with respect to the pointer assembly for picking or putting items and moved away from the pointer assembly after the picking or putting is complete wherein said order assembly positions are vertically arranged and wherein said pointer is positioned above an operator's height so that the operator does not block the pointer beam.

10. The order fulfillment system as claimed in claim 9 wherein said pointer assembly is generally stationary.

11. The order fulfillment system as claimed in claim 9 wherein said pointer assembly is moveable.

12. A method of fulfilling orders, comprising:
positioning one of a plurality of mobile assembly carts adjacent a pointer assembly, each of said carts having a plurality of order assembly positions and a unique identifier, including observing the identifier of the cart adjacent the pointer assembly;
generating a beam with said pointer assembly and directing the beam to at least one of said assembly positions for selectively identifying at least one of said assembly positions;
putting an item to or removing an item from the at least one of said assembly positions identified with said beam to assemble an order; and
moving the cart away from the pointer assembly after the picking or putting.

13. The method as claimed in claim 12 including identifying an item and instructing said pointer assembly to point to at least one particular one of said assembly positions as a function of the identity of that item.

14. The method as claimed in claim 12 including identifying an item by scanning that item with an item scanner.

15. The method as claimed in claim 14 wherein including reading said unique identifier with said scanner.

16. The method as claimed in claim 12 including displaying at least one chosen from alpha-numeric text and symbols at the at least one of said assembly positions with said pointer assembly.

17. The method as claimed in claim 12 wherein said pointer assembly comprises a steerable laser assembly.

18. The method as claimed in claim 12 wherein said generating a beam includes generating a beam having a green or red spectral component.

19. The method as claimed in claim 12 wherein said pointer assembly is generally stationary.

20. The method as claimed in claim 12 wherein said pointer assembly is moveable.

21. The method as claimed in claim 12 including picking items to receptacles from an inventory warehouse with multiple different items for multiple orders in each of said receptacles and supplying each of the receptacles to said mobile assembly cart for assembling of customer orders.

22. The method as claimed in claim 12 including determining if a batch of orders is complete and positioning another of a plurality of mobile assembly carts adjacent a pointer assembly if the batch of orders is not complete.

23. A method of fulfilling orders, comprising:
positioning one of a plurality of mobile assembly carts adjacent a pointer assembly, each of said carts comprising a plurality of order assembly positions;
generating a beam with said pointer assembly and directing the beam to at least one of said assembly positions for selectively identifying at least one of said assembly positions;
putting an item to or removing an item from the at least one of said assembly positions identified with said beam to assemble an order; and
moving the cart away from the pointer assembly after the picking or putting including self-aligning said pointer assembly with said one of said plurality of mobile assembly carts.

24. A method of fulfilling orders, comprising:
positioning a mobile assembly cart comprising a plurality of order assembly positions adjacent a pointer assembly;
generating a beam with said pointer assembly and directing the beam to at least one of said assembly positions for selectively identifying at least one of said assembly positions;
putting an item to or removing an item from the at least one of said assembly positions identified with said beam to assemble an order; and
moving the cart away from the pointer assembly after the picking or putting wherein said order assembly positions are vertically arranged and wherein said directing the beam is from above an operator's height wherein an operator does not block the beam.

* * * * *

UNITED STATES PATENT AND TRADEMARK OFFICE
CERTIFICATE OF CORRECTION

Page 1 of 1

PATENT NO. : 9,626,714 B2
APPLICATION NO. : 14/801911
DATED : April 18, 2017
INVENTOR(S) : Boer et al.

It is certified that error appears in the above-identified patent and that said Letters Patent is hereby corrected as shown below:

In the Claims

Column 5
Line 22, "portions" should be --positions--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*